(12) United States Patent
McConnell

(10) Patent No.: US 7,136,814 B1
(45) Date of Patent: Nov. 14, 2006

(54) SYNTAX-DRIVEN, OPERATOR ASSISTED VOICE RECOGNITION SYSTEM AND METHODS

(75) Inventor: Theodore Van Fossen McConnell, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1014 days.

(21) Appl. No.: 09/706,326

(22) Filed: Nov. 3, 2000

(51) Int. Cl.
*G10L 17/00* (2006.01)

(52) U.S. Cl. ............... 704/246; 704/270; 704/270.1

(58) Field of Classification Search ........ 704/270–275, 704/260, 235, 251, 246; 379/67.1, 88
See application file for complete search history.

(56) References Cited

U.S. PATENT DOCUMENTS

| | | | | |
|---|---|---|---|---|
| 5,555,299 A | * | 9/1996 | Maloney et al. | 379/212.01 |
| 5,703,943 A | * | 12/1997 | Otto | 379/265.11 |
| 5,758,322 A | * | 5/1998 | Rongley | 704/275 |
| 5,774,859 A | | 6/1998 | Houser et al. | |
| 5,839,104 A | | 11/1998 | Miller et al. | |
| 5,878,155 A | * | 3/1999 | Heeter | 382/115 |
| 5,884,032 A | * | 3/1999 | Bateman et al. | 709/204 |
| 5,915,001 A | | 6/1999 | Uppaluru | |
| 5,920,696 A | | 7/1999 | Brandt et al. | |
| 5,940,799 A | * | 8/1999 | Bruckert et al. | 704/273 |
| 6,016,476 A | | 1/2000 | Maes et al. | |
| 6,021,400 A | * | 2/2000 | Gallacher et al. | 705/43 |
| 6,023,688 A | | 2/2000 | Ramachandran et al. | |
| 6,044,362 A | | 3/2000 | Neely | |
| 6,078,886 A | * | 6/2000 | Dragosh et al. | 704/270 |
| 6,108,632 A | * | 8/2000 | Reeder et al. | 704/275 |
| 6,144,940 A | | 11/2000 | Nishi et al. | |
| 6,195,417 B1 | * | 2/2001 | Dans | 379/67.1 |
| 6,246,981 B1 | * | 6/2001 | Papineni et al. | 704/235 |
| 6,516,340 B1 | * | 2/2003 | Boys | 709/204 |

* cited by examiner

*Primary Examiner*—Vijay Chawan
(74) *Attorney, Agent, or Firm*—Leonard W. Lewis; Erich D. Hemm

(57) ABSTRACT

Methods and apparatus are described for effecting a computer transaction using speech as a primary input. The speech is captured using a speech recognition program. A context associated with the captured speech is determined. Where the context has been determined, the computer transaction is built based on the context and at least a portion of the captured speech. A representation of the computer transaction is presented to a human operator for verification. The computer transaction is effected upon verification by the human operator.

35 Claims, 4 Drawing Sheets

SYNTAX-DRIVEN, OPERATOR ASSISTED VOICE RECOGNITION SYSTEM AND METHODS

BACKGROUND OF THE INVENTION

The present invention relates to the use of voice recognition technology to effect transactions. More specifically, the present invention provides systems and methods for effecting computer transactions using natural human speech as the primary input.

Currently available systems by which consumers engage in remote telephone transactions with companies are typically of two types, each of which have significant limitations. The first type of system employs traditional live telephone interactions between the consumer and a human operator an example of which will be described with reference to FIG. 1.

The consumer initiates contact by making a telephone call and is typically placed in a queue, remaining on hold until the next available operator can take the call (102). When the call is finally answered, the operator collects the consumer's identifying or contact information (104) and then together the consumer and the operator frame the consumer's need which may, for example, be a request for information, a complaint, or an order for products or services (106). The consumer and operator continue to interact thereby establishing the parameters of the transaction (108). The operator transcribes the transaction parameters into a computer readable form thereby generating a computer transaction (110). The operator then submits the transaction for processing (112).

This traditional approach potentially presents a variety of undesirable barriers to the consumer. These barriers include, for example, the inconvenience of waiting on hold and the often challenging communications with operators. Even more significantly, this approach can be prohibitively expensive for most applications. This is especially the case where the number of transactions for a given system is anticipated to be high.

The second type of system by which consumers engage in remote telephone transactions addresses some of these problems. Automated systems employ everything from recorded messages and user prompts for touch-tone input to sophisticated voice recognition technology. An example of such a system will now be described with reference to FIG. 2.

The consumer initiates contact by making a telephone call (202) in response to which the consumer is typically presented with a series of prompts (204). The consumer interacts with the system providing input in response to the prompts (206) until the transaction is complete (208) at which point the transaction is submitted for processing (210). The input provided by the consumer may take the form of spoken responses or touch-tone input via the consumer's telephone key pad. The input may correspond, for example, to information identifying the consumer, the transaction type, and the specifics of the transaction (e.g., order information).

If the consumer encounters any problem navigating the automated process at (212), he may elect to interact with a live operator (213) in which case the process proceeds as described above with reference to FIG. 1. This may occur at any point in the automated process as indicated by the dashed lines. When the consumer is eventually connected to an operator, the operator collects the consumer's identifying or contact information (214) and then together the consumer and the operator frame the consumer's need which may, for example, be a request for information, a complaint, or an order for products or services (216). The consumer and operator continue to interact thereby establishing the parameters of the transaction (218). The operator transcribes the transaction parameters into a computer readable form thereby generating a computer transaction (220). The operator then submits the transaction for processing (222).

Automated systems such as the one described above with reference to FIG. 2 eliminate the need for human operators which is the single most costly feature of traditional live operator system. In addition, if they work effectively (and thus largely avoid the use of live operators), such systems virtually eliminate the inconvenience of being put on hold and the frustration of dealing with surly or uncommunicative operators.

Unfortunately, there are a number of drawbacks associated with automated systems. For example, significant consumer frustration is reported which relates to navigating through systems using automated prompts. The time penalty associated with this system navigation is doubly problematic from a company's perspective in that not only does is it present a potential deterrent to customers, it also presents a bottleneck to order processing.

In addition, systems which rely on voice recognition technology have their own limitations. That is, voice recognition systems, especially speaker independent systems, are not accurate enough to reliably process non-trivial transactions, especially where some means for allowing the consumer to provide immediate corrections is not available. This is due, in part, to the fact that, for the foreseeable future, voice recognition technology will not be able to accommodate all possible nouns in all possible languages. This is further exacerbated by inaccuracies caused by a variety of signal impairments including, for example, low gain, poor signal-to-noise ratio, spurious noise, and ambient noise. The fact of the matter is that current voice recognition technology, by itself, simply cannot be relied upon in automated systems for the processing of complex transactions, especially where the scale of such transactions is millions per day.

In view of the foregoing, it is desirable to provide a transaction processing system which uses natural human speech as its primary input and which avoids the disadvantages of currently available systems.

SUMMARY OF THE INVENTION

According to the present invention, a transaction processing techniques are provided which use natural human speech as the primary input. According to various embodiments, the present invention combines the advantages of voice recognition technology with flexible responsiveness of a human operator without suffering from the disadvantages described above. According to a specific embodiment, a user, e.g., a consumer, initiates contact with the system via, for example, a phone call or a voice-over-IP transmission. The user then states his business using natural speech which is captured by the system using voice recognition software. The voice file generated from the captured speech is then scanned for keywords which relate to a particular type of transaction or target subsystem. A context is determined from any keywords found which defines a new limited vocabulary. A second scan of the voice file is then effected with reference to this contextual vocabulary to identify additional keywords. According to one embodiment, the system attempts to recognize further non-keywords.

Using the keywords and the context, a computer transaction is then built by populating a predefined template relating to the type of transaction or target subsystem. This computer transaction is then routed to a human operator along with a representation of the voice file corresponding to the captured speech. The human operator checks the voice file against the transaction for accuracy, makes any necessary corrections, and sends the finalized transaction to the target subsystem for processing.

Thus, the present invention provides methods and apparatus for effecting a computer transaction using speech as a primary input. The speech is captured using a speech recognition program. A context associated with the captured speech is determined. Where the context has been determined, the computer transaction is built based on the context and at least a portion of the captured speech. A representation of the computer transaction is presented to a human operator for verification. The computer transaction is effected upon verification by the human operator.

A further understanding of the nature and advantages of the present invention may be realized by reference to the remaining portions of the specification and the drawings.

DETAILED DESCRIPTION OF SPECIFIC EMBODIMENTS

Figure 1:
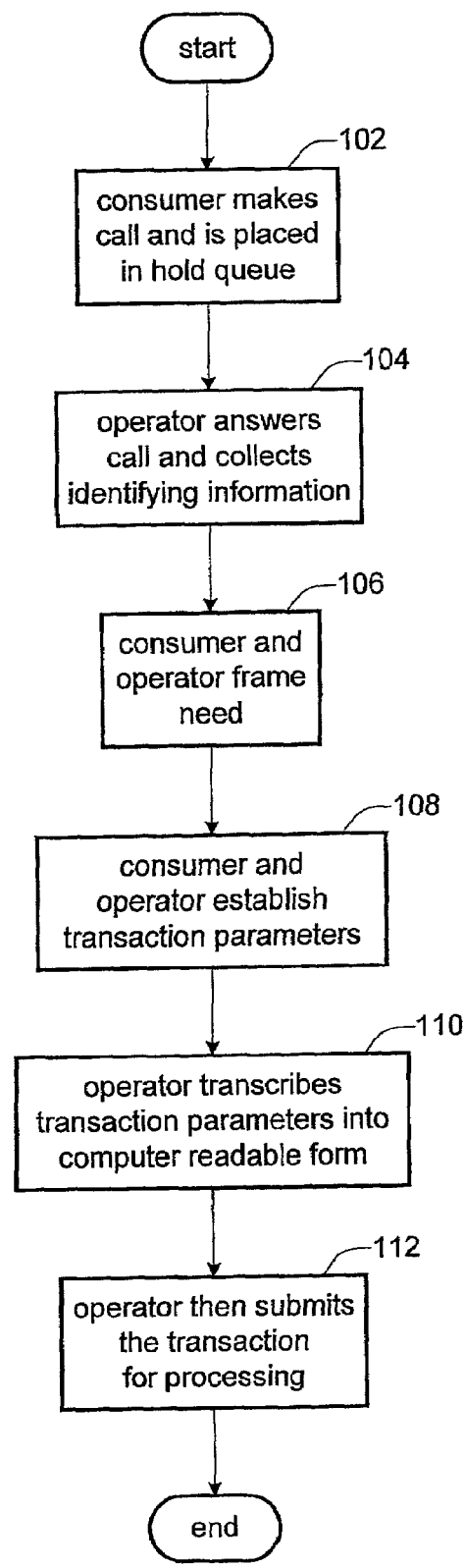
FIG. 1 is a flowchart illustrating one technique for engaging in a transaction over a telephone line.
Figure 2:
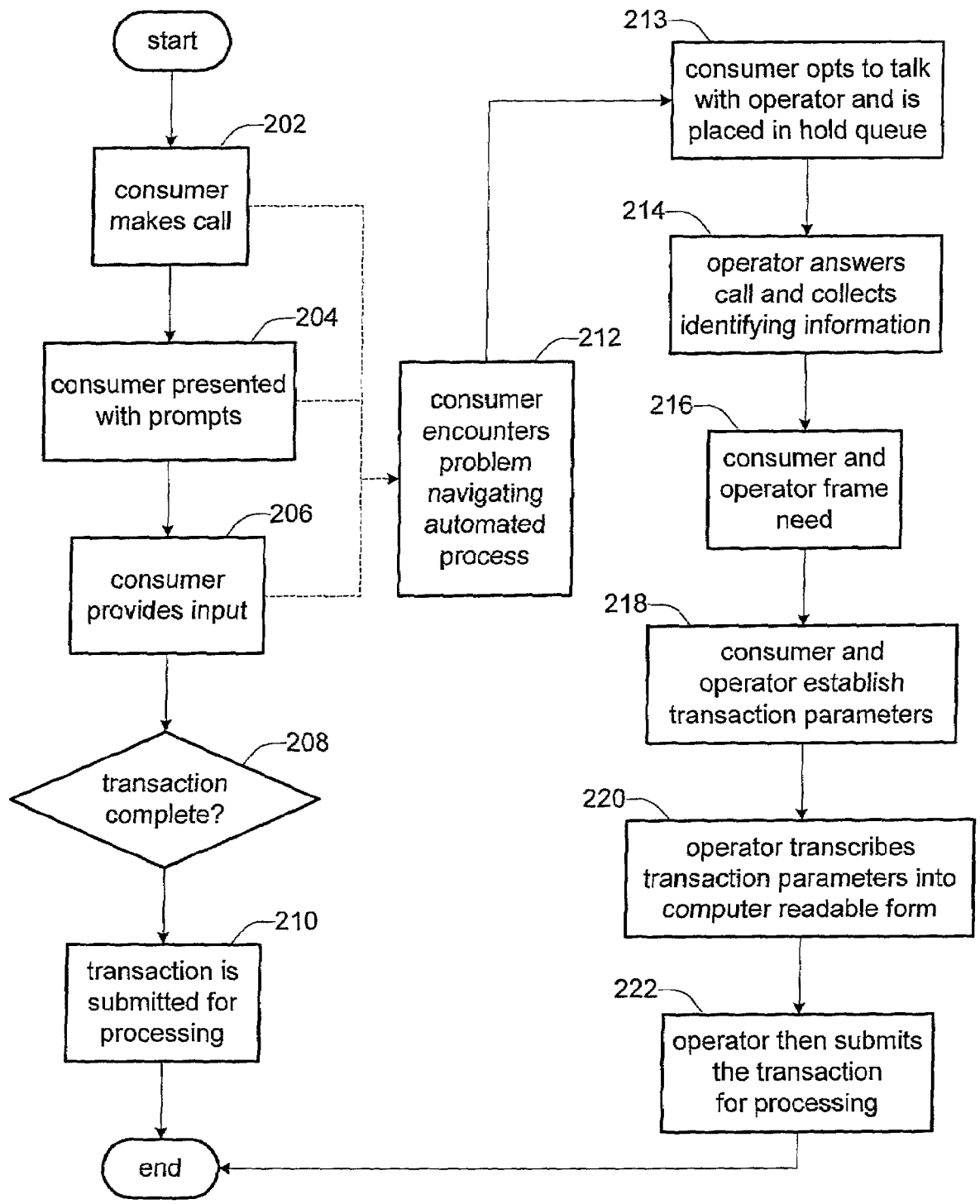
FIG. 2 is a flowchart illustrating another technique for engaging in a transaction over a telephone line.
Figure 3:
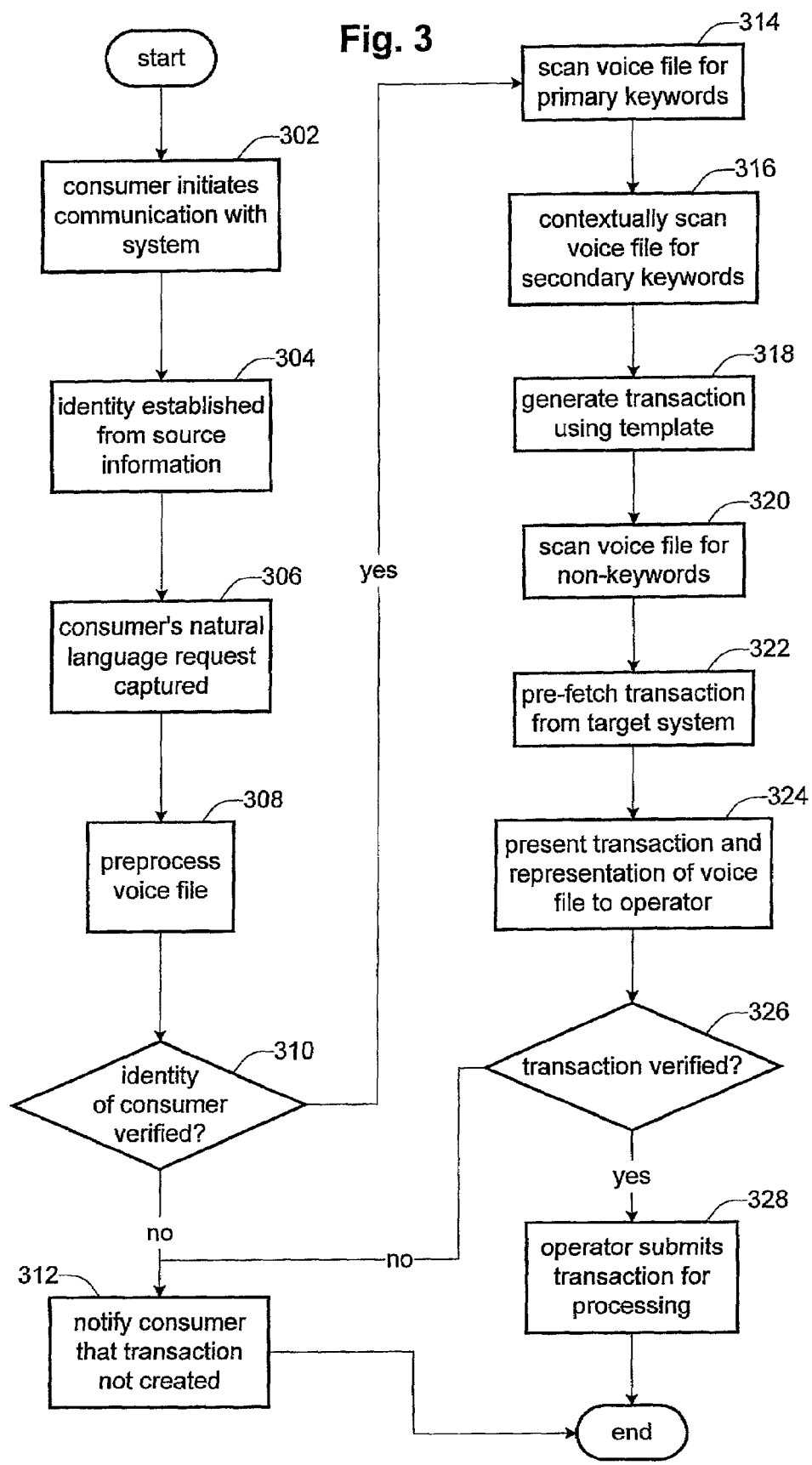
FIG. 3 is a flowchart illustrating creation of a computer transaction according to a specific embodiment of the present invention.

FIG. 3 is a flowchart illustrating the operation of a transaction creation system designed according to a specific embodiment of the present invention. An individual, e.g., a consumer, initiates a communication with the system by, for example, making a telephone call to a pre-designated number (302). Alternatively, this communication could be initiated in a variety of ways such as, for example, selection of a link in a browser on a personal computer. According to various embodiments, the identity of the caller or the target transaction subsystem may be determined (304) with reference to the number of origin, the number to which the call is directed, or any of a variety of other means. For example, where the communication comprises a data transmission over a wide area network, this information may be determined with reference to IP header information including packet source and destination addresses.

Based on identity information determined in 304, the incoming communication is routed to the appropriate device or software module along with the information determined in 304 for processing. Thus, where the communication is a phone call, an automatic call distributor may be employed to route the call appropriately. Alternatively, where the communication is a data transmission, the data may be transmitted to the appropriate server and/or module for processing. In some embodiments, the information determined in 304 may be employed to identify the type of transaction to be created.

The consumer's natural language voice request is then captured using any of a variety of currently available speech recognition technology (306) such as, for example, speech recognition software provided by Lernout & Hauspie (www.lhsl.com). For phone embodiments, this may be preceded by brief instructions to the consumer and some sort of tone or beep indicating that the consumer should begin speaking. For internet embodiments, such information may be provided in the page in which the link to the system is provided. The speech is captured in a digital audio file such as, for example, an MPEG-layer 3 file, a wave file, or the like. According to a specific embodiment, the information determined in 304 and the audio file are the basic data required to create the transaction. According to a more specific embodiment, once the consumer's speech has been captured, the consumer terminates the communication (whether phone call or data transmission), and the transaction creation process continues without the consumer's further participation.

The creation of a computer transaction using the audio file data will now be described with reference to 308 et seq. The audio file is preprocessed to eliminate impairments which impede the voice recognition process (308). Such impairments include, but are not limited to, low gain, poor signal-to-noise ratio, spurious noise, and ambient noise. Various signal processing techniques may be employed to remove such impairments. For example, unwanted sounds may be removed from the audio signal. This may be done by 1) filtering out frequencies outside of the range of the human voice, 2) filtering out specific noise patterns corresponding to known noise, e.g., telephone system hiss, and 3) normalizing the gain of the audio file to a high gain, i.e., turning up the volume. It will be understood that any of a variety of other signal processing techniques may be employed as appropriate.

According to an optional embodiment, the identity of the speaker is verified using speaker-independent voice recognition technology. This may be done, for example, by matching the audio file of the captured speech to a previously recorded voice print corresponding to the identity information determined in 304. If the speaker's identity is not verified (310), a remedial transaction is generated by which the consumer is notified via any of a variety of means that the intended transaction may not have been created (312). For example, an automatic phone communication, an e-mail, or a fax may be generated.

If the speaker's identity is verified (310), the speech recognition processing of the audio file is performed as follows. The captured speech is initially scanned for primary keywords for the purpose of creating a context for further processing (314). This portion of the process may scan for specific primary keywords relating to a transaction type or target subsystem for which the current transaction is being created (i.e., as determined, for example, in 304). If such primary keywords are found, a corresponding context is established having an associated limited vocabulary.

A subsequent scan of the audio file for secondary keywords is then done with reference to this specific vocabulary (316) which is determined based on the primary keywords found in the first scan. Thus, according to a specific embodiment, if the first scan of the audio file recognizes the primary keyword "calendar," a context is established in which the second scan of the audio file looks for secondary keywords pertaining to calendar updates. According to various embodiments, context generation may occur in a recursive fashion to build successively more specific contexts. This layering of contexts increases the efficiency with which the speech recognition technology operates.

Using the recognized keywords, the context, and any information determined in 304, a computer transaction is then generated (318). According to one embodiment, the transaction is generated using a predefined template which may correspond, for example, to the context determined during scanning of the audio file, or alternatively any of the information determined in 304. The system then executes a final scan of the audio voice file in an attempt to recognize additional non-keywords which provide additional information or qualify the transaction in some way (320). For example, if previous scans recognized "calendar" as a primary keyword, and "next Tuesday," "add," and "1:00 pm" as secondary keywords, it might then recognize the words "dental appointment" as additional information to be included in the calendar item as the actual action item. The transaction is then initiated (pre-fetched) from the target subsystem (322).

That is, the data regarding the transaction is transmitted to the operator so that it can be presented substantially simultaneously with the audio information. This enables the following stages of the process to refer to other information which may pertain to the current transaction. In addition, because the profit margins of businesses relying on this type of customer interface depend heavily upon the speed with which operators can process transactions, this aspect of the present invention enhances profitability by giving the operator everything she needs to process the transaction at the right moment.

Once the computer transaction has been generated and forwarded to the terminal of a human operator, a representation of the audio file is also forwarded to the operator's terminal for verification (324). According to various embodiments, the representation of the audio file may comprise the actual audio file which may be played back for the operator, or a direct text translation of the audio file. The operator listens to or views the representation of the audio file and compares it to the computer transaction to determine whether the system-generated transaction makes sense in relation to the captured speech. If the transaction is accurate or correctable, the operator makes any necessary corrections thereby verifying the transaction (326), and then submits the transaction to the appropriate subsystem for final processing (328). If, on the other hand, the operator cannot verify the transaction, e.g., it doesn't make sense, the consumer is notified that the transaction has not been created (312).

Figure 4:
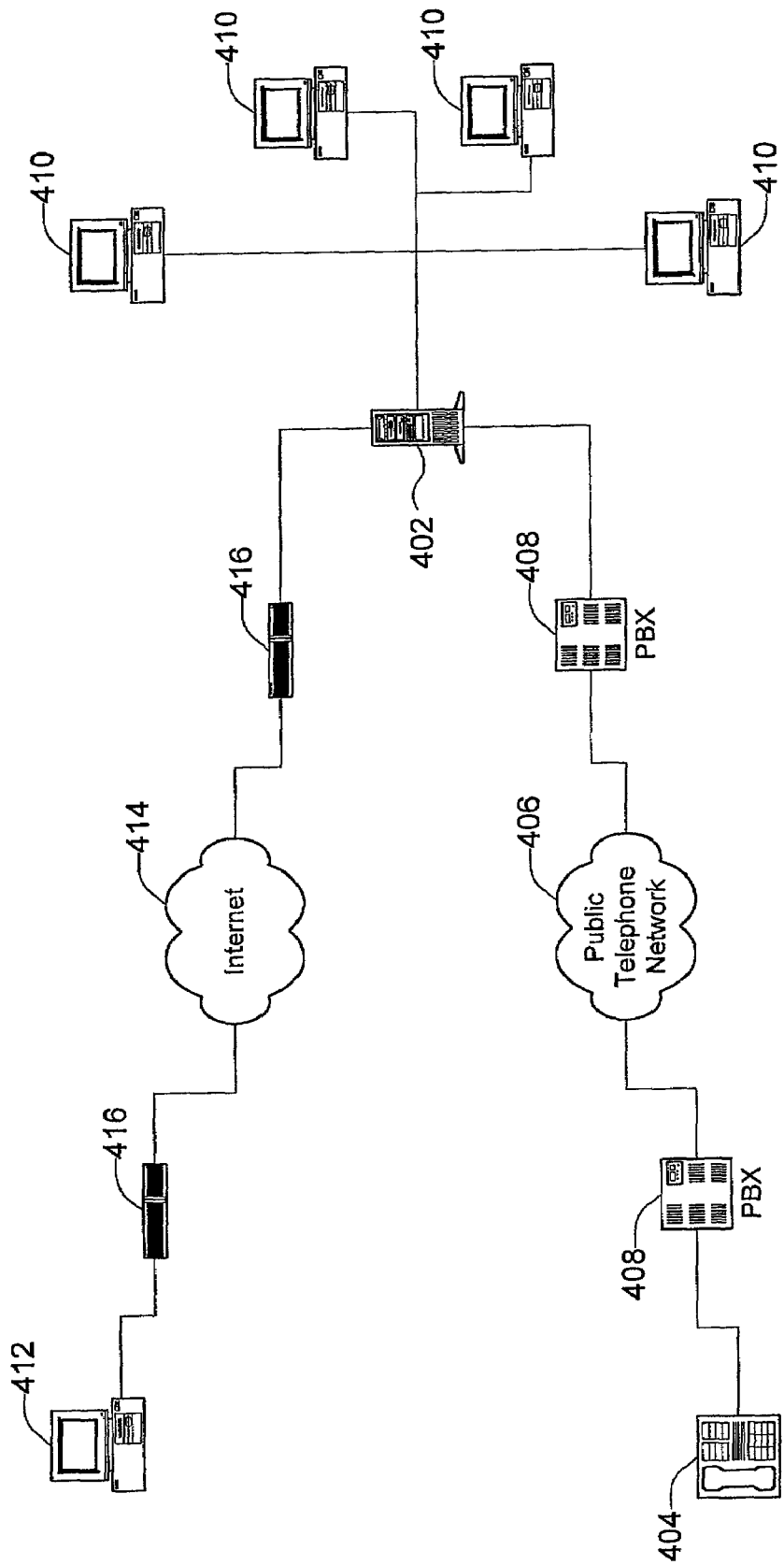
FIG. 4 shows a network environment in which a specific embodiment of the present invention may be implemented.

FIG. 4 is a diagram of a network environment in which specific embodiments of the present invention may be implemented. As described above, a consumer may connect with a company (represented by server 402) via a phone 404 and the public telephone network (represented by network 406 and public branch exchanges 408). The software and automated processes described herein may be performed by server 402 in conjunction with operator terminals 410.

Also as described above, a consumer may connect with the system represented by server 402 using a personal computer 412 to transmit and receive data over a wide area network such as, for example, Internet 414 via routers 416. The consumer would use an audio capture device associated with PC 412 to enter the request. It will be understood that in such an embodiment, at least a portion of the voice recognition technology may reside on PC 412.

It will also be understood that server 402 may represent a plurality of computing devices arranged in a wide variety of configurations, and that operator terminals 410 represent a wide variety of interface devices connected to the system represented by server 402 in a variety of ways. For that matter, the network configurations shown in FIG. 4 are merely illustrative and should not be construed to limit the scope of the invention. That is, there are many hardware and software configurations which can be used to implement the basic idea represented by the present invention as exemplified in the claims.

The system described herein avoids the limitations of previous systems described above. That is, the system of the invention provides the capability to resort to interpretation of a natural language command by a human should the accuracy be in doubt. In addition, the training of the user in an informal syntax which provides context is employed as a means to help the voice recognition system. Pre-establishing context by identifying which words will be used for which systems as keywords allows the user to speak in a natural language while enabling the system to accurately pick out important information without prompting the user, and without interacting with the user for purposes of clarification.

While the invention has been particularly shown and described with reference to specific embodiments thereof, it will be understood by those skilled in the art that changes in the form and details of the disclosed embodiments may be made without departing from the spirit or scope of the invention. Therefore, the scope of the invention should be determined with reference to the appended claims.

What is claimed is:

1. A method for effecting a computer transaction using speech as a primary input, comprising:
   capturing the speech from a speaker using a speech recognition program;
   determining a context associated with the captured speech;
   where the context has been determined, building the computer transaction based on the context and at least a portion of the captured speech;
   presenting a representation of the computer transaction to a human operator for verification, wherein said sneaker is distinct from said human operator; and
   effecting the computer transaction upon verification by the human operator.

2. The method of claim 1 further comprising, where the context has not been determined, notifying the speaker that the computer transaction may not have been effected.

3. The method of claim 1 wherein capturing the speech comprises receiving the speech via a telephone network.

4. The method of claim 3 wherein capturing the speech further comprises receiving a call with an automatic call distribution system which routes the call to a particular service.

5. The method of claim 4 wherein at least one of a user identity and the particular service is identified using source information associated with the call.

6. The method of claim 1 further comprising verifying an identity of the speaker by comparing a first voice file corresponding to the captured speech with a previously generated voice file corresponding to the speaker.

7. The method of claim 6 further comprising notifying the speaker that the computer transaction may not have been effected where the identity of the speaker has not been verified.

8. The method of claim 1 wherein capturing the speech comprises receiving the speech via a wide area network.

9. The method of claim 8 wherein the wide area network comprises the World Wide Web.

10. The method of claim 1 wherein capturing the speech occurs without interruption by prompting.

11. The method of claim 1 wherein the speech comprises natural speech with flexible syntax.

12. The method of claim 1 wherein the speech recognition program is a speaker-independent speech recognition program.

13. The method of claim 1 further comprising preprocessing the speech to ameliorate effects of impairments impeding voice recognition.

14. The method of claim 13 wherein the impairments include at least one of low gain, poor signal-to-noise ratio, spurious noise, and ambient noise.

15. The method of claim 1 wherein determining the context comprises scanning a voice file associated with the captured speech for primary keywords.

16. The method of claim 15 wherein determining the context further comprises scanning the voice file for secondary key words with reference to the context established with reference to the primary keywords.

17. The method of claim 16 wherein the context corresponds to a limited keyword vocabulary, the secondary keywords being determined with reference to the limited keyword vocabulary.

18. The method of claim 16 wherein deterring the context further comprises scanning the voice file for non-keywords.

19. The method of claim 18 wherein the non-keywords are determined using a speaker-dependent voice recognition program.

20. The method of claim 1 wherein building the computer transaction comprises populating a predefined template according to the context and the at least a portion of the captured speech.

21. The method of claim 20 wherein building the computer transaction further comprises populating the predefined template according to at least one of an identity of the speaker and a transaction type.

22. The method of claim 21 wherein the identity of the speaker is determined from at least one of the speech and source information associated with transmission of the speech.

23. The method of claim 21 wherein the transaction type is determined from at least one of the speech and source information associated with transmission of the speech.

24. The method of claim 20 further comprising selecting the predefined template based on at least one of an identity of the speaker and a transaction type.

25. The method of claim 1 wherein presenting the representation of the computer transaction to the human operator comprises presenting a representation of a voice file associated with the captured speech to the human operator for comparison with the representation of the computer transaction.

26. The method of claim 25 wherein presenting the representation of the voice file to the human operator comprises presenting an audio playback of the captured speech associated with the voice file.

27. The method of claim 25 wherein presenting the representation of the voice file to the human operator comprises presenting a text representation of the captured speech associated with the voice file.

28. The method of claim 1 further comprising revising the computer transaction according to at least one instruction received from the human operator.

29. The method of claim 1 wherein effecting the computer transaction comprises transmitting the computer transaction to a target system for processing in response to at least one instruction received from the human operator.

30. The method of claim 1 wherein processing of the computer transaction subsequent to capturing of the speech occurs after a connection with the speaker is terminated.

31. A computer program product comprising a computer readable medium having computer program instructions stored therein for performing the method of claim 1.

32. A method for effecting a computer transaction using speech as a primary input, comprising:
   capturing the speech from a speaker using a speech recognition program;
   scanning a voice file associated with the captured speech for primary keywords;
   determining a context using the primary keywords, the context comprising a limited keyword vocabulary;
   scanning the voice file for secondary key words with reference to the limited keyword vocabulary;
   building the computer transaction by populating a predefined template according to the context and the at least a portion of the captured speech;
   presenting a representation of the computer transaction to a human operator,
   wherein said human operator is distinct from said speaker;
   presenting a representation of the voice file to the human operator for comparison with the representation of the computer transaction; and
   transmitting the computer transaction to a target system for processing in response to at least one instruction received from the human operator.

33. A computer program product comprising a computer readable medium having computer program instructions stored therein for performing the method of claim 32.

34. A method for effecting a computer transaction using speech as a primary input, comprising:
   capturing the speech in a communication from a speaker using a speech recognition program;
   determining at least one of an identity of the speaker and a transaction type from at least one of source information associated with the communication and the speech;
   notifying the speaker where at least one of the identity and the transaction type is not determined;
   scanning a voice file associated with the captured speech for primary keywords;
   determining a context using the primary keywords, the context comprising a limited keyword vocabulary;
   scanning the voice file for secondary key words with reference to the limited keyword vocabulary;
   building the computer transaction by populating a predefined template according to the context and the at least a portion of the captured speech;
   presenting a representation of the computer transaction to a human operator,
   wherein said human operator is distinct from said speaker;
   presenting a representation of the voice file to the human operator for comparison with the representation of the computer transaction; and
   transmitting the computer transaction to a target system for processing in response to at least one instruction received from the human operator.

35. A computer program product comprising a computer readable medium having computer program instructions stored therein for performing the method of claim 34.

* * * * *

UNITED STATES PATENT AND TRADEMARK OFFICE
CERTIFICATE OF CORRECTION

PATENT NO.          : 7,136,814 B1                                      Page 1 of 1
APPLICATION NO. : 09/706326
DATED               : November 14, 2006
INVENTOR(S)      : Theodore Van Fossen McConnell It is certified that error appears in the above-identified patent and that said Letters Patent is hereby corrected as shown below:

Column 4, line 3, "w.lhsI.com" should be --www.lhsl.com--.

Column 6, line 36, "sneaker" should be --speaker--.

Column 7, line 21, "deterring" should be --determining--.

Signed and Sealed this

Fifteenth Day of May, 2007

JON W. DUDAS
*Director of the United States Patent and Trademark Office*